United States Patent [19]

Connors et al.

[11] Patent Number: 5,409,159

[45] Date of Patent: Apr. 25, 1995

[54] APPARATUS AND METHODS FOR INERTING SOLDER DURING WAVE SOLDERING OPERATIONS

[75] Inventors: Robert W. Connors, Western Springs; Frederick W. Giacobbe, Naperville; Benjamin J. Jurcik, Jr., Lisle, all of Ill.; Frederic Rotman, Paris, France; Kevin P. McKean, Naperville, Ill.

[73] Assignees: L'Air Liquide, Société Anonyme pour l'Etude et l'Exploitation des Procedes Georges Claude, Paris, France; American Air Liquide, Inc.; Air Liquide America Corp., both of Walnut Creek, Calif.

[21] Appl. No.: 253,248

[22] Filed: Jun. 2, 1994

Related U.S. Application Data

[63] Continuation-in-part of Ser. No. 202,489, Feb. 28, 1994.

[51] Int. Cl.[6] .......................... B23K 1/00; B23K 3/00
[52] U.S. Cl. .......................... 228/219; 228/42
[58] Field of Search .......................... 228/180.1, 219, 260, 228/37, 42, 56.2; 239/461; 118/58, 67

[56] References Cited

U.S. PATENT DOCUMENTS

| | | | |
|---|---|---|---|
| 3,705,457 | 12/1972 | Tardoskegyi | 228/37 |
| 4,538,757 | 9/1985 | Bertiger | 228/37 |
| 4,606,493 | 8/1986 | Christoph et al. | 228/219 |
| 4,610,391 | 9/1986 | Nowstarsky | 228/37 |
| 4,646,958 | 3/1987 | Howard, Jr. | 228/220 |
| 4,746,289 | 5/1988 | Guillaume | 432/8 |
| 4,821,947 | 4/1989 | Nowotarski | 228/219 |
| 4,921,156 | 5/1990 | Hohnerlein | 228/37 |
| 5,044,542 | 9/1991 | Deambrosio | 228/37 |
| 5,048,746 | 9/1991 | Elliott et al. | 228/37 |
| 5,071,058 | 12/1991 | Nowotarski | 228/219 |
| 5,121,874 | 6/1992 | Deambrosio et al. | 228/219 |
| 5,121,875 | 6/1992 | Hagerty et al. | 228/219 |
| 5,193,734 | 3/1993 | Takayama et al. | 228/37 |
| 5,203,489 | 4/1993 | Gileta et al. | 228/37 |
| 5,240,169 | 8/1993 | Gileta | 228/37 |
| 5,292,055 | 3/1994 | Gileta | 228/37 |
| 5,294,036 | 3/1994 | Den Dopper | 228/37 |

FOREIGN PATENT DOCUMENTS

49/119433 10/1974 Japan.
57/9010 2/1982 Japan.
61/286058 12/1986 Japan.

*Primary Examiner*—Samuel M. Heinrich
*Attorney, Agent, or Firm*—Burns, Doane, Swecker & Mathis

[57] ABSTRACT

A circuit board is wave soldered as it is carried by a conveyor through a solder wave established in a solder reservoir. Disposed on both sides of the solder wave are gas plenums which discharge shield gas. Each gas plenum includes a top wall, a side wall, and a bottom wall. The side wall is spaced horizontally from the wave, and the bottom wall is submerged within the solder. The side and (optionally) top walls include orifices for directing shield gas (i) at high velocity toward the solder wave to protect the solder wave with an atmosphere of shield gas, and (ii) upwardly toward an underside of the circuit board to strip entrained air therefrom. Instead of being submerged within the solder, the bottom wall could be spaced above the solder and provided with orifices to emit shield gas downwardly between the plenum and solder reservoir to create an inert atmosphere above the solder. Dividers disposed within the plenum form sub-chambers communicating with orifices in respective walls of the plenum so that different gas velocities can be entitled from the orifices. The gas plenums can be rotatably adjustable and further adjustable either vertically or horizontally.

60 Claims, 6 Drawing Sheets

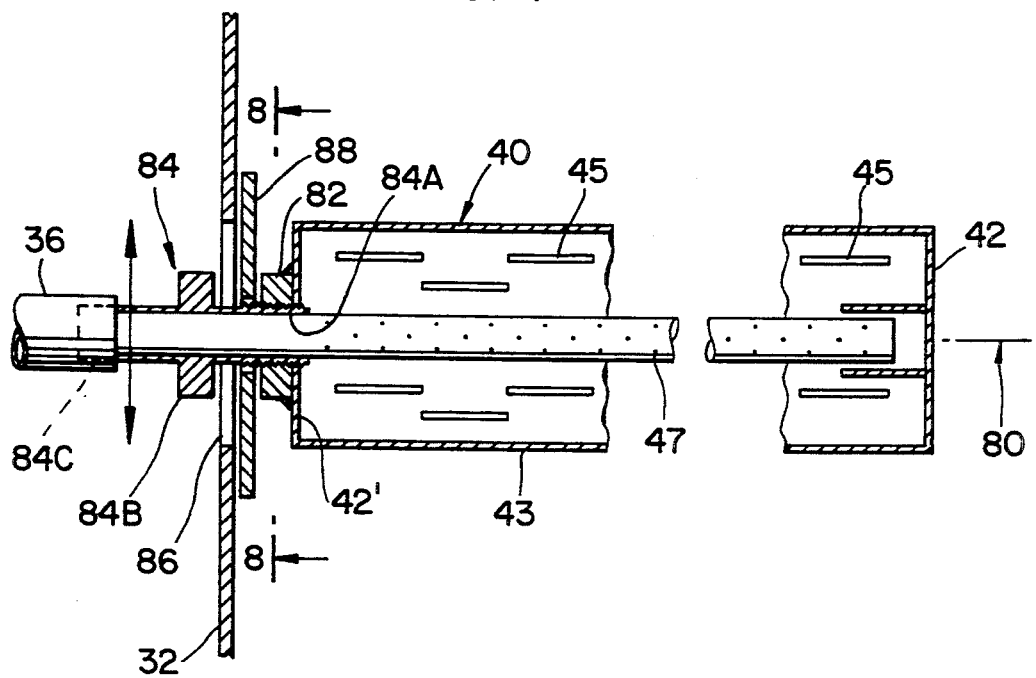
FIG. 7
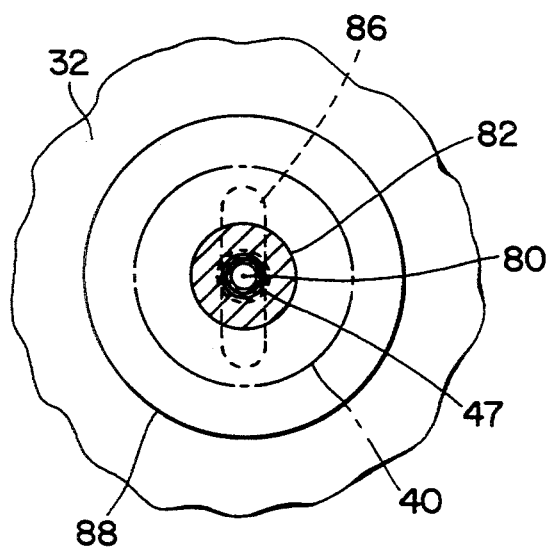
FIG. 8
FIG. 9

APPARATUS AND METHODS FOR INERTING SOLDER DURING WAVE SOLDERING OPERATIONS

RELATED INVENTION

This is a Continuation-in-Part of U.S. application Ser. No. 08/202,489, filed Feb. 28, 1994. The specification of that application is incorporated herein by reference.

BACKGROUND OF THE INVENTION

The present invention relates to apparatus and methods for providing a non-oxidizing atmosphere at the surface of a wave soldering bath to discourage the formation of oxides on the liquid solder surfaces, especially during the wave soldering of circuit boards.

Wave soldering machines have been introduced for a long time in the industry to automatically solder components on a circuit board, such as a circuit board, wiring board, etc., which operation was earlier done by hand. A usual wave soldering machine comprises at least one preheating zone to preheat the circuit board, at least one soldering zone to solder the components to the board by coating the bottom side of the circuit board with molten solder contained in a solder pot, and at least one cooling zone where the solder is solidified. This soldering process, or coating process, is usually conducted in the presence of a fluxing agent which agent is used to improve the wetting of the copper surface on the bottom of the circuit board which surface needs to be joined or coated. The fluxing agents are usually corrosive and the excess or residue of these agents must be cleaned after the wave soldering operation.

Low residue no-clean fluxes or flux-less processes have been developed wherein it is possible to carry out the wave soldering process without the inconvenience of standard fluxing agents, under a substantially oxygen-free atmosphere, such as nitrogen.

U.S. Pat. No. 3,705,457 discloses one of the earliest wave soldering processes, including injection of an inert gas to avoid oxidation of the metallic surfaces of the printed circuit board.

U.S. Pat. No. 4,538,757 discloses a wave soldering process under a reducing atmosphere comprising nitrogen and hydrogen, and nitrogen curtains at entrance and exit of the machine to inhibit atmosphere exchange with the ambient air.

U.S. Pat. No. 4,606,493 discloses a method and apparatus for soldering printed circuit boards under an inert gas atmosphere to prevent oxidation of the electrical (usually copper) connections due to the heat produced during soldering and reduce the occurrence of thermal stress defects in the circuit carrier. To this end, an inert gas is injected through slits to provide a plurality of jets of high velocity which impinge the bottom side of the printed circuit board. As a condition of operation, the temperature of the inert gas jets is about twice as high as the temperature of the molten solder in the solder pot (600° C.).

U.S. Pat. No. 4,646,958 discloses a solder reflow, or solder chip process which is carried out in a flux-less or flux free system, under an atmosphere comprising nitrogen and saline, or hydrogen and saline.

U.S. Pat. No. 4,821,947 discloses a process to coat a molten metal to a metal-comprising surface without using a flux. This process is carried out in an inert atmosphere in which the temperature is sufficiently low that no damage is done to the metal-comprising surface, and no damage is done to materials such as components adjacent to the metal-comprising surface.

U.S. Pat. No. 5,071,058 discloses a process for conducting a joining/coating operation which is carried out in a controlled oxidizing atmosphere, having an oxidation capability greater than that required to oxidize a metal-comprising filler material used for joining or coating, but having less oxidation capability than that of air. In case of a wave soldering process the oxygen content in the inert gas atmosphere is at least 10 ppm and preferably at least 500 ppm.

U.S. Pat. No. 5,121,875 discloses a short hood for wave soldering machines, wherein preheating of the printed circuit boards is carried out under air. In this process a no-clean flux is used and an oxygen concentration which is less than 5% is recommended at the solder pot.

U.S. Pat. No. 4,921,156 discloses an apparatus having a soldering chamber and comprising means to inject a protective gaseous atmosphere in the soldering chamber and sealing skirt means protruding downwardly into the pool of molten metal solder. Preferably the protective gaseous atmosphere is comprised of nitrogen and possibly of some reducing agent.

U.S. Pat. No. 4,746,289 discloses a process for treating parts under a non-reactive atmosphere with laminar flow conditions. The laminar flow conditions disclosed in this patent usually apply for inert gas injection in wave soldering machines.

In sum, a substantially oxygen-free atmosphere has been achieved by a so-called fully inerted wave soldering system, and a dross reduction boundary system.

The fully inerted wave soldering systems currently uses a tunnel type of system. That type of system is very expensive and time-consuming to install. Because this type of machine uses a tunnel, the access to the assemblies being soldered is greatly reduced. To achieve the desired results that type of system must operate at very high gas flow rates (over 1500 scfh). By doing this, the oxygen ppm level in the inerting system is kept low, thus yielding the desired results. If the flow rate is reduced, the atmosphere becomes unstable and benefits are lost. The primary goal of the fully inerted system is keep the oxygen ppm level below approximately 100 ppm, and preferably below 10 ppm. This then would yield the maximum dross reduction with the greater wettability for soldering.

The dross reduction boundary inerting system was developed to address the problems of the fully inerted system. The design was such that it can be easily installed and is much lower in cost. The other goal of this system was to have a reduced inerting gas flow rate. While those goals appear to have been met, the performance of that system is greatly reduced as compared to that of the fully inerted system. Because the boundary inerting system depends on a circuit board being present for the inerting to take place, the actual inerting effect is never fully achieved. The dross reduction of such a system is typically at best 70% (with reference to a solder pot operating without an inerting gas) with only marginal if any improvements in wettability.

Examples of a dross reduction boundary inerting system can be found in the following Japanese documents: Japanese Utility Model Laid/Open (KOKAI) No. Sho-49-119433 (Yamada et al); Japanese Utility Model Publication No. Sho-57-90-10 (Takemura); and Japanese Laid/Open (Kokai) NO. Sho-61-286058 (Furuya). Each of those documents discloses an inerting system in which a cover is positioned over a solder bath to form a space above the bath, and inerting gas is supplied beneath the cover to inert the solder surface, as well as to pass upwardly through slots formed on opposite sides of a solder wave. The inerting gas thus flows in counterflow relationship with both sides of the wave along the entire height of the wave to inert the wave. Circuit boards are conveyed across the upper end of the wave to cause the undersides of the boards to be soldered.

In U.S. Pat. Nos. 5,203,489; 5,240,169; 5,292,055; and 5,121,874, similar inerting systems are disclosed and wherein gas supply pipes are located on opposite sides of the wave. In U.S. Pat. No. 5,294,036 a gas supply pipe is disposed on only one side of the wave.

A shortcoming which is characteristic of the systems of all of the previously referenced patents involves the relatively large surface area of the solder bath that is susceptible to being oxidized by any air that may migrate thereto. That is, notwithstanding the presence of a cover, the entire surface of the solder bath beneath the cover is exposed to whatever atmosphere exists beneath the bath. In the prior art system depicted in FIG. 13, a cover plate C extends across the top of the reservoir R and includes recesses to accommodate the solder waves. On the sides of each solder wave there is thus formed a chamber CH bordered on its top by the cover, on its bottom by the solder reservoir, one side by the solder wave, and on an opposite side by either (i) a stationary wall (of the solder pot or solder pot housing), or (ii) another solder wave (in the case where the chamber is situated between two solder waves). Each chamber includes a gas outlet defined by a gap G formed between the solder wave SW and an edge of the cover slot.

Disposed within each chamber is a gas discharge pipe P extending parallel to the length of the solder wave. A shield gas is discharged from orifices in the gas discharge pipe to create an inert atmosphere within the chamber CH, whereby virtually the entire surface of solder in the reservoir is inerted by the shield gas. A flow F of shield gas exits the chamber through the outlet. That gas flow is intended to provide an inert blanket across the portion of the wave side which projects above the gap G when a circuit board is present. However, when no circuit board is present, the portion TS of the top surface of the wave which curves away from the gap G is exposed to any ambient oxygen which may be present in the ambient atmosphere, whereupon dross can be formed. In the case of soldering operations in which there occurs a wide spatial gap between successive circuit boards being conveyed to the solder pot, it is not unusual for the solder wave pumps to be deactivated between the soldering of successive boards in order to minimize dross formation.

Furthermore, the behavior of the gas flow F emerging from the chamber can actually promote the formation of dross on the solder wave. In that regard, the pressure difference between the gas in the discharge pipe on the one hand and the atmosphere disposed above the chamber outlet, on the other hand, is relatively low. As a result, the velocity of the gas traveling within the chamber toward the outlet is relatively slow. Due to its slow travel, the gas will be significantly heated by the hot solder wave. Consequently, the hot gas flow F emerging from the gap G has a tendency to rapidly rise and create a free swirling convection current CC which draws the cooler atmosphere (and any oxygen contained therein) downwardly toward the solder wave, thus resulting in the formation of dross.

As pointed out earlier herein, all of the solder disposed beneath the cover is exposed and thus great care must be taken to inert the atmosphere beneath the cover. It would be desirable to minimize the amount of exposed solder and to do so while being able to eliminate the need for a cover.

Another region in which dross is formed in the solder is at the place where the drive shafts for the wave pumps enter the solder reservoir. The rotation of those shafts produces a churning of the solder, whereby oxidation is promoted.

It will be appreciated that the dross formed in the solder eventually builds up to a level requiring that the solder pot be shut-down to enable the dross to be skimmed off the top of the solder reservoir. The frequency at which those costly shut-downs occur is a function of the rate of dross formation.

Therefore, it would be desirable to minimize the rate of dross formation beyond the rates currently achieved.

There is presently still a need for wave soldering machines regarding an inert gas injection system and/or device which, without the need of covering the molten bath of solder and the related waves, provides similar or better results on dross reduction essentially by way of controlling the flow of inert gas, particularly in the wave(s) area(s), so that the gas shields the molten metal against oxidation.

SUMMARY OF THE INVENTION

The present invention relates to an apparatus for wave soldering a member, comprising a solder reservoir, a wave nozzle disposed in the solder reservoir, a pump for ejecting a solder wave upwardly from the wave nozzle, and a conveyor for conveying the member such that an underside thereof passes through the solder wave. At least one gas plenum is disposed adjacent the solder wave. Means is provided for introducing pressurized shield gas into the plenum. The plenum includes a bottom wall portion, and a side wall portion situated opposite the solder wave and spaced horizontally therefrom. The side portion has orifice means for discharging pressurized shield gas toward the solder wave. The bottom wall portion is submerged within the solder in the reservoir.

Preferably, at least the orifice means in the side wall is dimensioned so that pressurized shield gas is discharged therefrom toward the solder wave at a velocity in the range of 1–30 m/s.

A top wall portion of the plenum can be provided with orifice means for discharging shield gas upwardly against the underside of a member to strip entrained air therefrom. A gas impermeable divider can be disposed within the at least one plenum for dividing the plenum interior into sub-chambers communicating with the side wall portion and the bottom wall portion, respectively.

The means for introducing pressurized gas into the plenum may introduce separate gas flows into respective sub-chambers, the divider being gas impermeable.

The means for introducing pressurized gas may comprise a gas delivery conduit disposed within its respective plenum and extending substantially parallel to an adjacent solder wave. Respective gas delivery conduits could be provided for the sub-chambers. Alternatively, a single gas delivery conduit could be provided in one of the sub-chambers, and the divider could be gas permeable for communicating the sub-chamber with one or more of the other sub-chambers.

The gas plenum can be mounted for angular adjustment about a horizontal axis extending parallel to the solder wave. Also, the plenum can be adjusted vertically or horizontally.

Instead of being submerged within the solder, the bottom wall portion of the plenum could be spaced above the solder and provided with orifices to enable shield gas to be discharged into a space formed between the bottom wall portion and the solder.

BRIEF DESCRIPTION OF THE DRAWINGS

The objects and advantages of the invention will become apparent from the following detailed description of preferred embodiments thereof in connection with the accompanying drawings in which like numerals designate like elements and in which:

FIG. 7 is a vertical sectional view through an adjustable gas plenum according to the invention;

FIG. 8 is a sectional view taken along the line 8—8 in FIG. 7;

FIG. 9 is a view similar to FIG. 8 of a modified adjustable gas plenum;

DETAILED DESCRIPTION OF PREFERRED EMBODIMENTS OF THE INVENTION

Figure 1:
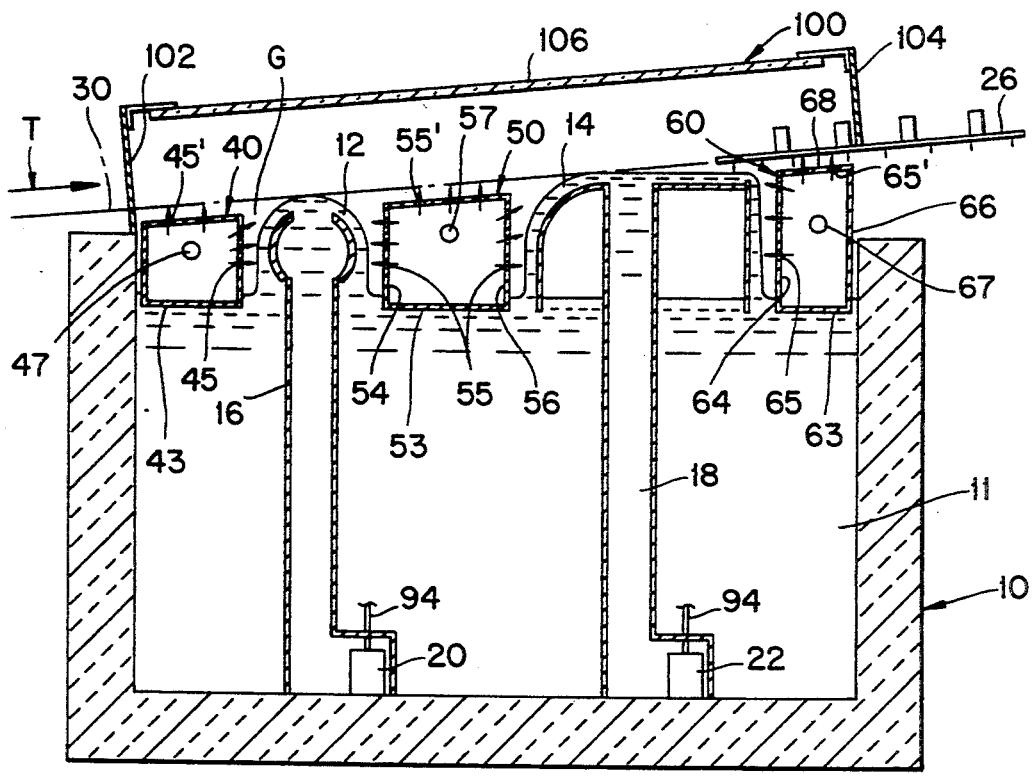
FIG. 1 is a vertical sectional view taken through a solder pot as a circuit board is being passed therethrough, in accordance with a first embodiment of the present invention.

Depicted in FIG. 1 is a solder pot 10 that contains a solder reservoir or bath 11 in which a pair of solder waves 12, 14 has been established by respective wave nozzles 16, 18 and adjustable pumps 20, 22 in a conventional manner. The wave 12 can be a turbulent wave, and the wave 14 can be a laminar wave, although the waves could exhibit any desired flow characteristics.

The wave 12 is disposed upstream of the wave 14, as defined with reference to the direction of travel T of circuit boards 26 that are conveyed by a conventional conveyor 30 such that at least the undersides of the circuit boards 26 pass sequentially through the solder waves 12, 14. The direction of travel T is inclined upwardly at an angle to horizontal, although it could be horizontal if desired.

A shield gas system is provided for resisting the oxidation of the solder in the reservoir. That system comprises a plurality of gas plenums 40, 50, 60, each forming an internal gas chamber. The first gas plenum 40 is located upstream of the first wave 12 (as defined with reference to the direction of conveyance of the circuit boards); the second gas plenum 50 is located between the waves 12, 14; the third gas plenum 60 is located downstream of the second wave 14. Each plenum is spaced from a respective solder wave to form a horizonal gap G therebetween, and is spaced from the surface of the solder bath to form a space therebetween.

Figure 2:
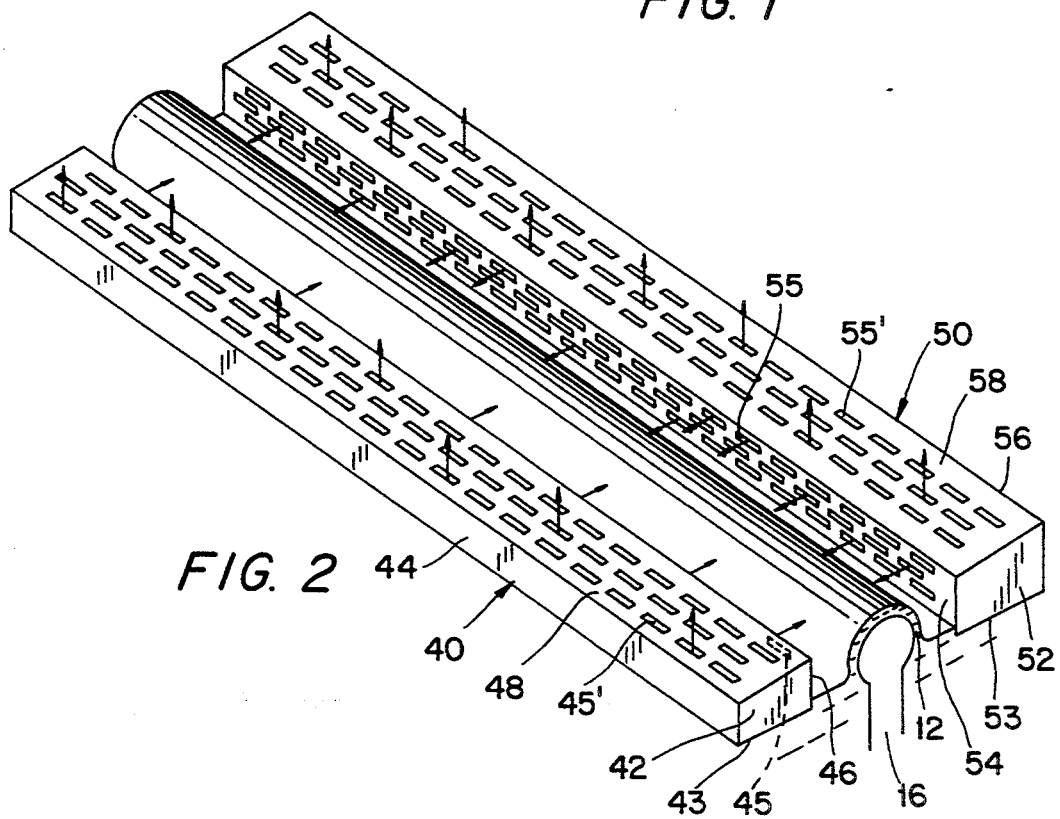
FIG. 2 is a top perspective view of a gas plenum assembly according to the first embodiment of the present invention.

Each gas plenum includes a top wall, a bottom wall and at least three upstanding walls, namely, one vertical end wall, and two vertical side walls. For example, shown in FIG. 2 are first and second ones of the gas plenums 40, 50. The first gas plenum 40 includes a vertical end wall 42, two vertical side walls 44, 46, a bottom wall 43 and a top wall 48. Likewise, the second gas plenum 50 includes one end wall 52, two side walls 54, 56, a bottom wall 43, and a top wall 58. Depicted in FIG. 1 are the side walls 64, 66, bottom wall 63, and top wall 68 of the third gas plenum 60. The top walls 48, 58, 68 are always situated below or even with a topside of the adjacent solder wave. The height of the solder bath is continuously controlled so that the bottom walls of all of the plenums are always submerged in the solder. By thus submerging the bottom walls, it is ensured that all solder disposed beneath the plenums will be shielded from oxygen, thereby eliminating the need to inert the entire surface of the solder.

The end of the plenum 40 disposed opposite the end wall 42 can be open (see FIG. 3) and placed sealingly against a fixed vertical wall 32 disposed within the reservoir. One end of the plenum 40 is attached to a wall 33 of the solder pot by means of a bracket 34, and the other end is attached to the wall 32 by a bracket 35. Similar brackets (not shown) are provided for attaching the other plenums 50, 60 to the walls 32, 34.

Alternatively, both ends of the plenums could contain a wall, whereby the interior of the plenum is entirely enclosed, as will be explained later in connection with FIG. 7.

Extending longitudinally within the plenum 40 is a gas delivery pipe 47 for pressurizing the interior chamber of the plenum 40 with shield gas. That pipe 47 is fastened to the wall 32 and is connected to a gas supply hose 36, the latter being connected to a source of pressurized shield gas, such as an inert gas, for example nitrogen, argon, carbon dioxide, a noble gas or any mixture thereof, or a mixture of an inert gas and a reducing gas such as H2, a hydride such as silicon hydrides, etc. The delivery pipe 47 includes suitable outlets for enabling the shield gas to be discharged generally uniformly along the length of the plenum.

Each of the other plenums 50 and 60 is provided with its own gas delivery pipe 57, 67 functioning in a manner similar to the pipe 47.

Each of the gas plenums has longitudinally spaced gas discharge orifices for discharging the gas. The first gas plenum 40 includes orifices 45 formed in its side wall 46 facing the first wave 12, and (optionally) orifices 45' in the top wall 48 (see FIGS. 2, 4); the second gas plenum 50 has orifices 55 formed in its side walls 54, 56 facing the first and second waves 12, 14, respectively, and (optionally) orifices 55' formed in the top wall 58; the third gas plenum 60 has orifices 65 in its side wall 64 facing the second wave 14, and (optionally) orifices 65' formed in the top wall 68. The orifices 45, 55, 65 produce a uniform distribution of gas along the length of the wave.

The discharge orifices are shown as comprising horizontally elongated slits arranged as vertically spaced rows of horizontally spaced slits, but they can assume any other desired configuration, such as horizontally spaced vertical slits. Instead of elongated slits, the orifices could be circular, oval or any other shape.

Importantly, the area of the discharge orifices of each side wall facing a solder wave is designed in conjunction with the magnitude of the gas flow provided to each plenum by the respective delivery pipe 47, 57, 67 to create a pressure in the range of 0.01–50.0 inches of water in each plenum, and such that the shield gas discharged therefrom in laminar streams toward the solder waves having a high velocity in the range of 1–30 m/s, more preferably 3–8 m/s.

Figure 4:
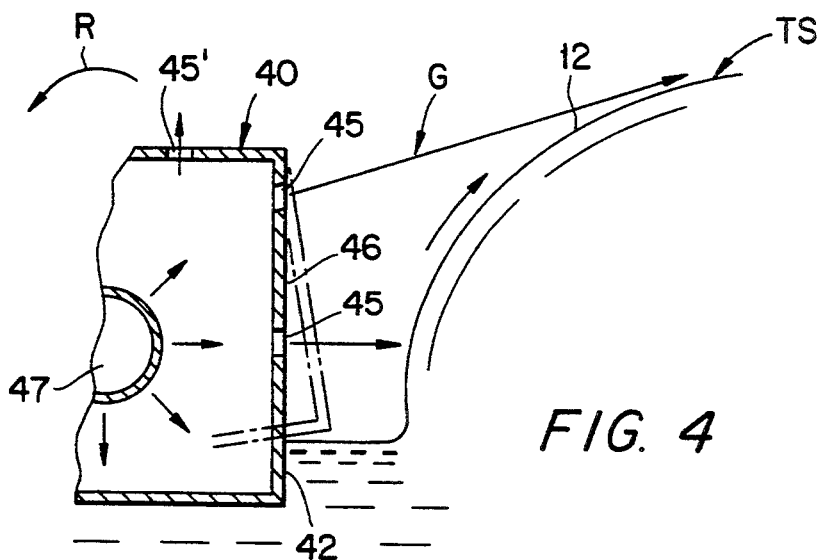
FIG. 4 is a fragmentary schematic view showing the direction of gas flow from a pressurized gas plenum according to the first embodiment of the present invention.

Furthermore, as shown in FIG. 4 the gas discharge orifices of the side walls of each plenum are arranged to direct the high velocity shield gas toward the respective solder wave from the bottom to the top thereof. Thus, the lower row(s) of slits 45 directs gas toward a lower portion of the wave (either horizontally or at an angle relative to horizontal); and the uppermost row of slits 45 directs gas toward an upper portion of the wave.

Figure 13:
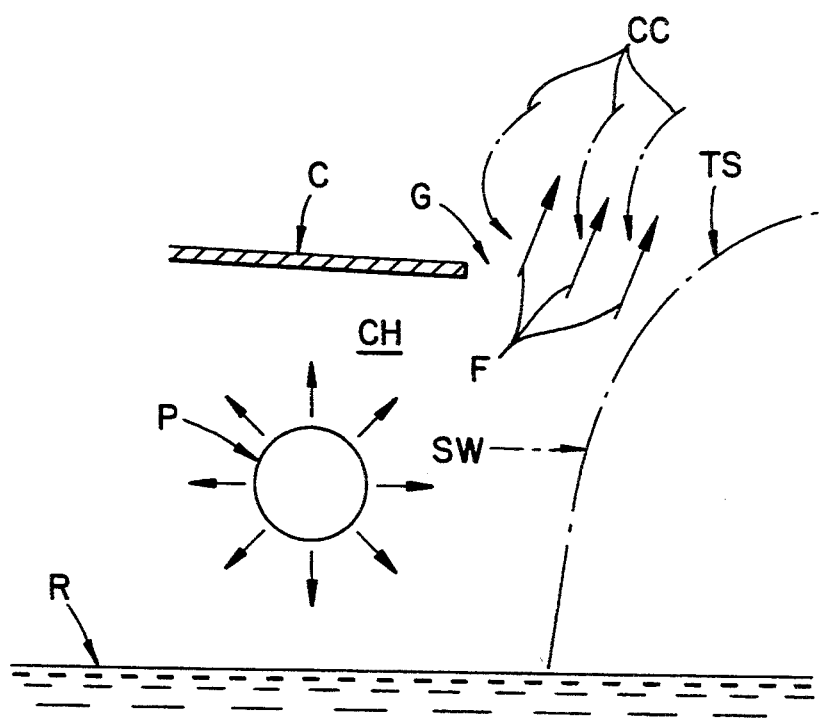
FIG. 13 is a view similar to FIG. 4 of a prior art arrangement.

In particular, the gas from the upper row of slits 45 is directed toward and across the portion of the top surface TS of the wave located above, and curving away from, the gap G, as shown in FIG. 4. As a result, high velocity gas emerging upwardly from the gap G is deflected to travel across the top of that portion TS of the wave top surface. The high velocity of the deflected gas provides the gas with a relatively high momentum which resists being displaced away from the wave by thermally generated forces emanating from the wave. Thus, even when there is no circuit board passing through the wave, a substantial portion (if not all) of the top surface of the wave will be blanketed by the gas, which tends to follow the contour of the wave for a substantial distance. This will not occur in the case of slow-moving gas which is not caused to be deflected, as shown in FIG. 13.

Furthermore, the high velocity of the gas according to the present invention minimizes the contact time between the gas and hot solder wave, so the gas exiting the gap G is relatively cool. That means that there will be less of a tendency for a swirling air current to be established above the gap which could draw cooler atmosphere (and possibly air) down toward the wave as compared to slower moving air which is significantly heated by the wave as previously described in connection with FIG. 13.

In addition, by discharging gas at high velocity from the slits, the slits will be less likely to become clogged by solder which may tend to splash toward the plenum. That would not be the case if the gas were to exit at such a slow speed that it could not effectively push away the solder.

Figure 5:
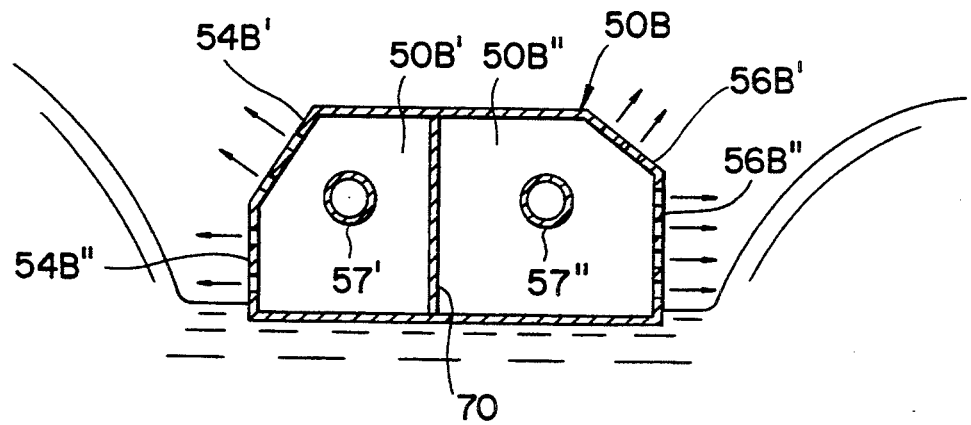
FIG. 5 is a cross-sectional view through a modified gas plenum.

It will be appreciated that the side walls 46, 54, 56, 64 need not be flat or perfectly vertical Instead, they could be curved in any direction and/or angled relative to vertical. It is only necessary that they be located generally opposite the respective solder wave so that gas streams emitted therefrom can contact the wave. Attention is directed to FIG. 5 wherein each of the side walls of the plenum 50B has upper and lower portions 54B′, 54B″, 56B′, 56B″. The upper portions 54B′, 56B′ are angled with respect to the lower portions to direct the inerting gas toward the top of the respective solder wave. That is, each upper portion faces in a direction having vertical and horizontal components, with the horizontal component being directed toward the adjacent solder wave.

The plenum 50B is also provided with a nonapertured divider 70 for dividing the plenum interior chamber into two subchambers 50B′, 50B″, each subchamber having a gas delivery pipe 57′, 57″. By separately regulating the gas supplied by each pipe 57′, 57″, the velocities of gases emitted from respective sides of the plenum can be varied relative to one another, so that those velocities can be adapted to the inerting requirements of the turbulent and laminar solder waves, respectively.

The side and top walls may assume any suitable configuration, such as convexly or concavely curved, as long as the inerting gas is directed toward the solder wave.

AS observed earlier, the top walls of one or all of the gas plenums can, if desired, be provided with gas discharge orifices. Gas discharged upwardly from those orifices bears against the undersides of the circuit boards to strip therefrom oxygen-containing air which may be entrained by the circuit boards. The total area of those top orifices is designed to provide a gas velocity in the range of 1–30 m/s, more preferably 3–8 m/s. Such a gas velocity is able to strip entrained air, without disrupting any solder (in the case of the second and third plenums 50, 60).

Each gas plenum 40, 50, 60 may be mounted so as to be adjustable about a horizontal axis 80 extending parallel to the adjacent wave (see FIGS. 7–9), and to be further adjustable either vertically or horizontally. In particular, the gas plenum 40 is shown in FIG. 7 as having, in addition to the previously described top, bottom, end, and side walls, an additional end wall 42′ which is welded to a jamnut 82 having an internal screw thread. Welded to the outer periphery of the gas delivery pipe 47 is a fitting 84 which includes a first sleeve part 84A extending through a vertical slot 86 formed in the wall 32 of the solder pot, the sleeve part 84A including an external screw thread. The fitting further includes a polygonal nut 84B to which a turning tool (e.g., wrench) can be applied, and a hose-receiving sleeve part 84C to which the hose 36 is attached.

The gas plenum 40 is mounted on the gas delivery pipe 47 by threading the jamnut 82 onto the sleeve part 84A of the fitting 84. A free end of the gas delivery pipe 47 is loosely received in a support collar 87 attached to an opposite end wall 42 of the plenum.

The plenum is then positioned at a desired elevation within the solder pot by raising or lowering the gas delivery pipe 47 within the slot 86. Also, the plenum is positioned in a desired angular orientation by being rotated about the axis 80 until the side wall 46 is in a desired orientation relative to the solder wave (e.g., the side wall is oriented vertical as shown in sold lines in FIG. 4, or at an inclination to vertical as shown in phantom lines in FIG. 4). Then, the gas delivery tube 47 is rotated by rotating the nut 84B to draw the plenum axially toward the wall 32 to tightly sandwich a sealing washer 88 between the jamnut 82 and the wall 32, whereby the plenum is securely held in position. The angular orientation of the plenum shown in phantom lines in FIG. 4 would not be performed in connection with the second plenum 50 whose side walls oppose respective solder waves, because when one side wall thereof is inclined at a desired angle to vertical, the other side would not be properly inclined. If angular adjustment is desired, the second plenum 50 would be formed of two separate plenums of similar construction to the first and third plenums 40, 60.

In order to enable the first and third plenums to be rotated about axis 80, a slight horizontal spacing is provided between each of those plenums and the adjacent wall of the solder pot as shown in FIG. 1. If no angular adjustment is provided, the plenums would be arranged flush with the respective walls of the solder pot.

Instead of being vertically adjustable within a vertical slot 86, the plenums could be horizontally adjustable within a horizontal slot 86A as shown in FIG. 9. Of course, the ability to angularly adjust the plenum about the axis 80 would be maintained. Thus, the structure of FIG. 9 would be identical to that of FIGS. 7 and 8, except that the slot 86A is horizontal rather than vertical.

If it is desired to make a plenum adjustable in three directions, i.e., vertically, horizontally, and angularly, a suitable mounting arrangement (not shown) could be provided.

It is preferred that a cover 100 be arranged over the solder reservoir, with inlet and outlet curtains 102, 104 being positioned over inlet and outlet ends of the enclosure. In that way, the shield gas can be better retained in the vicinity of the solder waves 12, 14. The curtains can comprise vertical strips of flexible material arranged in horizontally overlapping relationship. The strips would be attached only at their upper ends to enable the conveyor and circuit boards to push them aside. The cover preferably includes a transparent middle section 106 preferably formed of glass to permit the soldering operation to be observed. The cover 100 can be hinged at 110 (see FIG. 3) to permit the cover to be raised if desired.

Figure 3:
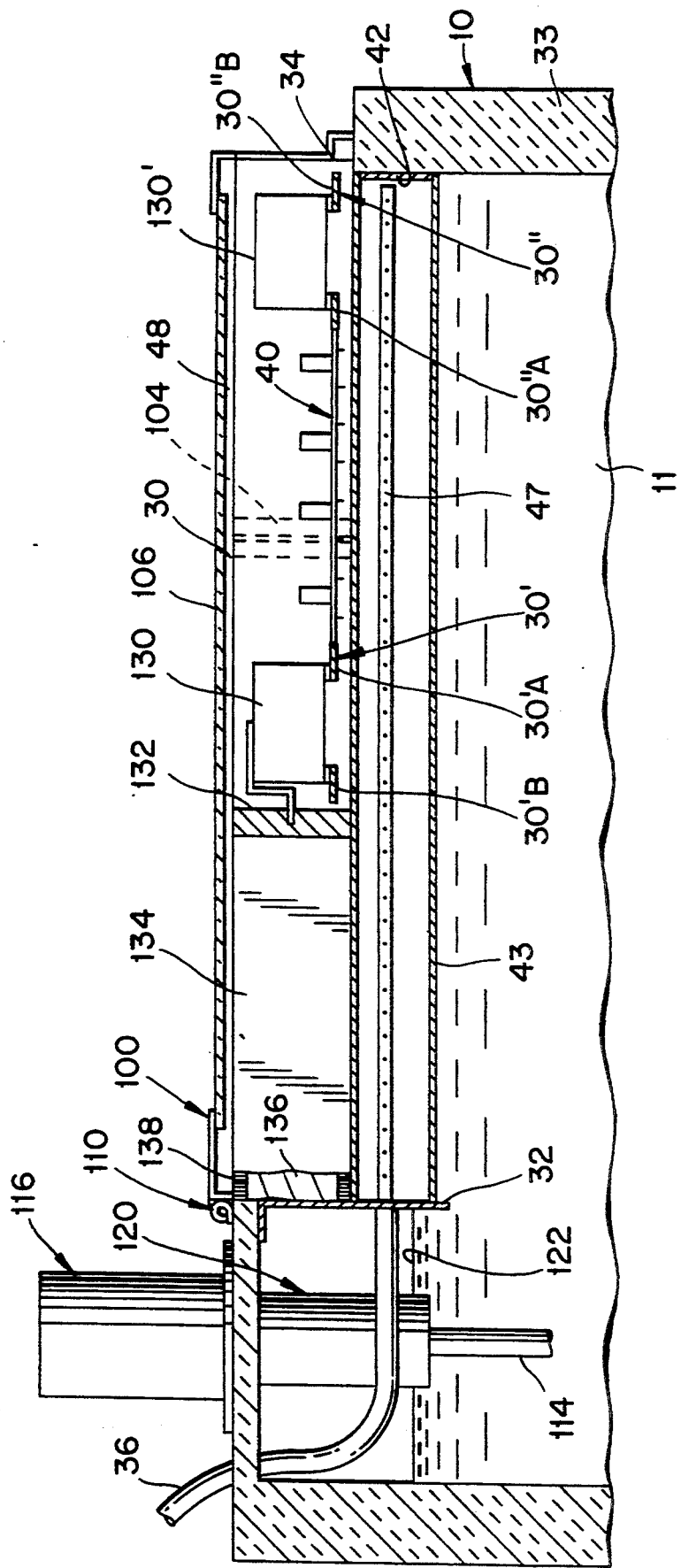
FIG. 3 is a vertical sectional view taken through the solder pot and a gas plenum according to the first embodiment of the invention.

The cover 100 is hinged to a section of the solder reservoir through which pump drive shafts 114 extend (see FIG. 3). Each pump drive shaft 114 is driven by a respective motor 116. In order to inert the area of the solder which is churned by the rotating action of the drive shafts 114, there is provided a stationary hollow sleeve 120 for each drive shaft. That sleeve 120 is of cylindrical configuration and extends downwardly below the upper level 122 of solder in the reservoir. Each drive shaft 114 extends through its respective sleeve 120. A shield gas under pressure is fed to the interior of the sleeve 120 by a supply hose (not shown), and the gas exits the sleeve 120 through a hole formed in the sleeve. Hence, the only portion of the solder reservoir which is churned by the rotating drive shaft 114 is disposed within the sleeve and is inerted by the shield gas which is maintained under pressure within the sleeve 120.

The conveyor 30 for the circuit boards 26 travels on conventional carriers 130, 130' (see FIG. 3). That is, the conveyor comprises a pair of endlessly rotating chains 30', 30". The chain 30' includes a flight 30'A traveling into the plane of the paper in FIG. 3 (i.e., traveling away from the observer), and a flight 30'B traveling out of the paper (toward the observer). Likewise, the conveyor chain 30" includes flights 30"A, 30"B traveling into and out of the paper, respectively. That conveyor arrangement is conventional. The carrier 130 is mounted to a wall 132 which is horizontally adjustable toward and away from the other carrier 130' in a conventional manner (not shown) to vary the spacing between the conveyor chains 30', 30" in order to accommodate circuit boards 26 of different widths. The carrier 130 is connected to a horizontal curtain 134 which is separate from the aforementioned curtains 102, 104 and is provided to cover the portion of the inlet and/or outlet not occupied by the conveyor 30. One end of the curtain 134 is mounted to a vertical roller 136 which is biased in rotation by coil torsion springs 138. The other end of the curtain is connected to the carrier 130. When the carrier 130 is horizontally adjusted in order to vary the conveyor width, the curtain 134 is automatically payed-out or wound up. The curtain 134 can be disposed at the inlet and/or outlet of the enclosure.

Instead of employing a curtain which rolls up, a collapsible curtain, e.g., a bellows-like member, could be employed which expands and contracts in an accordion-like manner when the carrier 130 is adjusted.

In operation, circuit boards 26 are conveyed by the conveyor 30 to the solder reservoir. The circuit boards may have been pre-treated with a flux and heated, in a conventional manner. As the circuit boards travel past the inlet curtain 102 and enter the enclosure 100, shield gas discharged upwardly from the top slits 45' of the first pressurized gas plenum 40 impinges against the underside of the circuit board to strip away entrained air as the board passes that gas flow. After passing the first pressurized gas plenum, the underside of the circuit board travels through the first solder wave 12 and is coated with solder in the customary manner. Then, the underside of the circuit board sequentially travels across: (i) an air-stripping flow of shield gas discharged from the top slits 55' of the second pressurized gas plenum 50 (assuming that the optional top slits are provided), (ii) the second solder wave 14, and (iii) an air-stripping flow of shield gas discharged from top slits of the third pressurized gas plenum 60 (assuming that the optional top slits are provided). The speed of the air-stripping gas flowing from the top slits of the second and third pressurized gas plenums 50, 60 is not great enough to disturb or remove solder from the undersides of the circuit boards.

The formation of dross in the solder is minimized by the effective measures taken to keep air away from the solder. That is, the air-stripping flows of shield gas discharged from the top slits of the gas plenums 40, 50, 60 minimize the concentration of oxygen traveling in the vicinity of the solder. There is thus achieved a shielding atmosphere which is retained by the enclosure 80.

The surface of the solder reservoir is protected against oxidation by being isolated from air, due to the submerging of the plenums in the solder reservoir.

Furthermore, the surfaces of the solder waves are protected against oxidation by shield gas ejected from the side slits 45, 55, 65 of the three pressurized gas plenums. Those gas flows are discharged at relatively high speed from the pressurized plenums, and are deflected by at least an upper gas flow from the plenum so as to travel across and in contact with the portion TS of the top surface of the wave which curves away from the gap G. That gas produces an effective inerting of the wave surface TS even in the absence of a circuit board.

The high velocity of the gas traveling toward the gap G results in the gas emerging from the slot G being cooler than in the case of slow-moving gas. Hence, there is less of a tendency for circular convection currents to be established which can pull oxygen-containing atmosphere down toward the wave.

As an example, a plenum operated in accordance with the present invention employed orifices in a side wall representing about one percent of the surface area of the side wall. A flow of 100 scfh was established in the plenum to produce about 0.06 in/water of pressure, and a gas velocity at the orifices of about 6 m/s. For a flow of 300 scfh, a pressure of about 0.5 inches of water and gas velocity of about 18 m/s was established.

This can be compared to values calculated for similar flows of an inerting system according to FIG. 13, wherein for a flow of 100 scfh a pressure of 0.0001 inches of water was calculated that would give a gas velocity at the gap of about 0.24 m/s. At a 300 scfh flow rate, the pressure was calculated to be 0.0008 inches of water and the gas velocity at the gap about 0.72 m/s. It will be appreciated that in the FIG. 13 structure, the gas velocity increases as the gas approaches the gap (which defines a restriction). Thus, the gas flow within the chamber CH of FIG. 13 would be even lower than the 0.24 m/s and 0.72 m/s values. Those values can be compared, respectively, to the velocities of about 6 m/s and 18 m/s achievable in connection with the presently claimed invention.

The relatively high pressure of shield gas within the gas plenums serves to expel any oxygen therefrom.

The solder which is churned by the rotating drive shafts 114 of the wave pumps will not be oxidized, because it is blanketed by pressurized shield gas within the sleeves 120.

Figure 6:
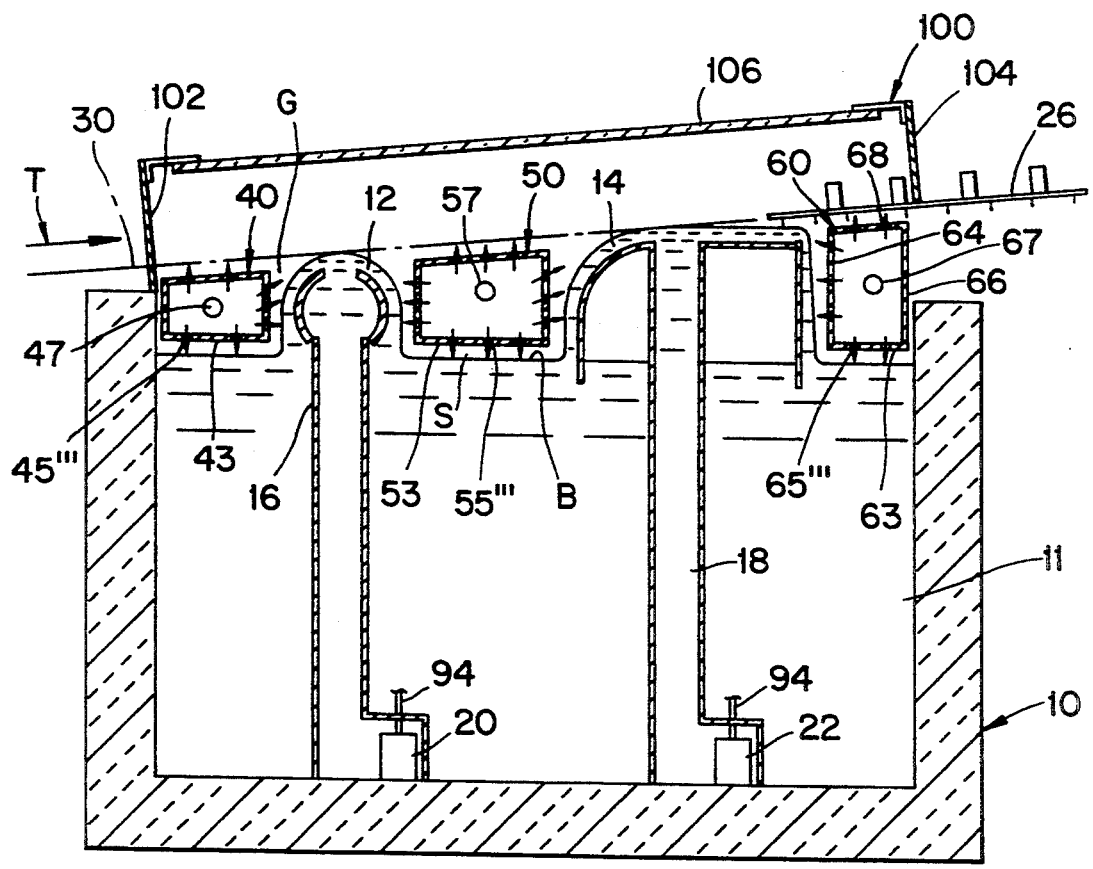
FIG. 6 is a view similar o FIG. 1 of a second preferred embodiment of the invention.

Another embodiment of the invention, depicted in FIG. 6 is similar to that disclosed earlier, except that the plenums 40, 50, 60 are not submerged within the solder reservoir. Rather, the bottom wall of each plenum is spaced above the surface B of the solder reservoir, and is provided with orifices 45''', 55''', 65''' to eject inerting gas into a space S formed between the bottom wall and the solder surface B. The velocity of that gas is preferably less than that of gas emitted from the side orifices; those gas velocities can be independently regulated by controlling the total areas of the respective sets of gas orifices.

Figure 10:
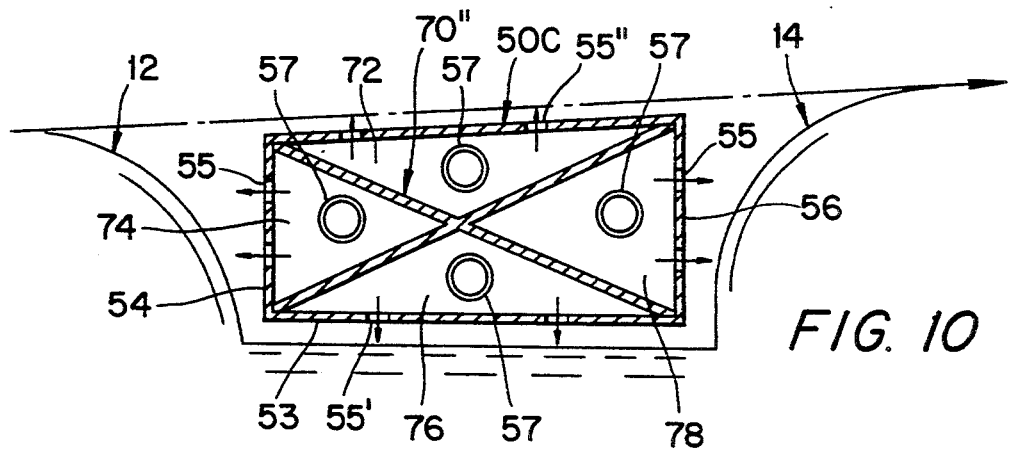
FIGS. 10, 11 and 12 are cross-sectional views of modified plenums, respectively, for use in the FIG. 6 embodiment.

Alternatively, the plenums can be provided with a gas non-permeable divider 70 as shown in FIG. 10 with respect to the second plenum 50C. The divider 70'' divides the interior chamber of the plenum 50 into four subchambers 72, 74, 76, 78, each of which being provided with its own gas delivery pipe 57. By controlling the amounts of gas supplied by the respective pipes 57 (and/or by controlling the orifice size as noted earlier), the velocities of gas emitted from the respective walls can be independently regulated.

As an alternative to providing separate gas delivery tubes 57 for the respective sub-chambers, a single gas delivery tube 57 could be provided for delivering gas to one sub-chamber. For example, with reference to FIG. 11, an apertured (i.e., gas permeable) divider 70'' is provided which divides the interior of plenum 50D into two sub-chambers 72A, 76A. The gas delivery tube 57 is situated within the sub-chamber 72A, and gas is discharged from that sub-chamber through orifices formed in the top and side walls and also in the divider 70''. The total area of orifices in the divider is designed in conjunction with the rate of gas inflow from the delivery tube to create a desired pressure within the sub-chamber 72A. The velocities of gases emitted from the respective top and side walls can be controlled by the sizes of orifices provided therein.

Figure 11:
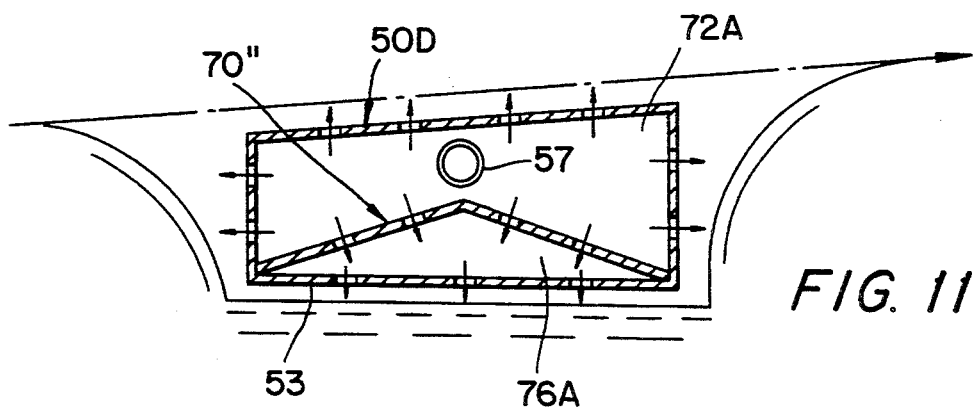

The sizes of the respective orifices in the divider 70'' and bottom wall 53 of FIG. 11 can be designed to provide a desired gas pressure within the sub-chamber 76A and a desired velocity of gas emitted from the bottom wall. The velocity of gas discharged from the bottom wall can thus be reduced to a desired low value.

Figure 12:
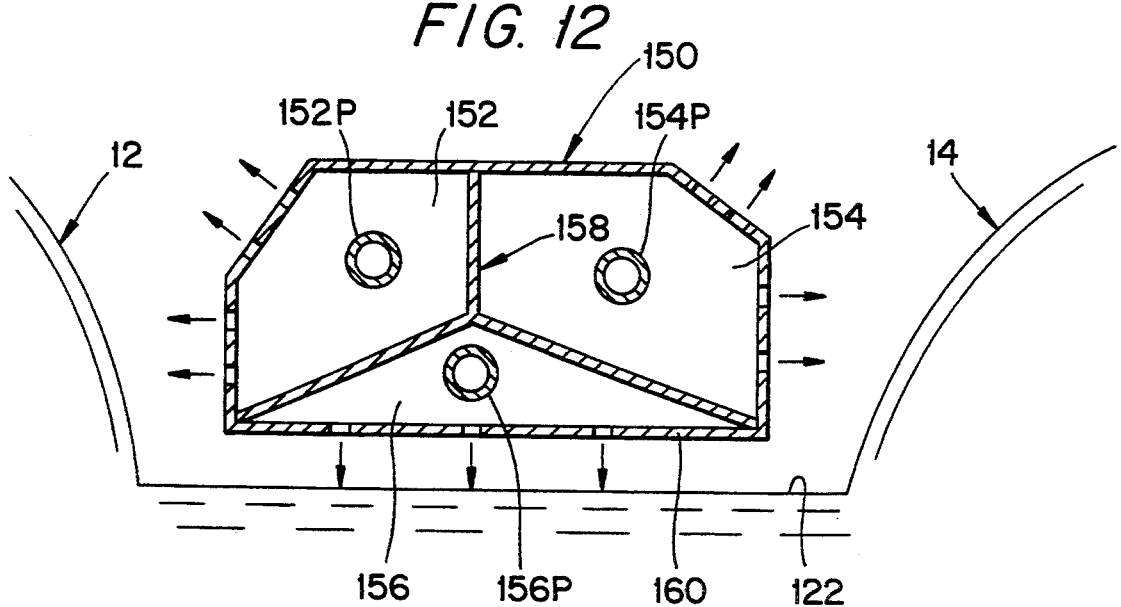

FIG. 12 depicts another embodiment of a gas plenum 150 comprising three subchambers 152, 154, 156, each separated from the other by a non-permeable divider 158. Each subchamber has its own gas delivery pipe 152P, 154P, 156P providing an independent control of gas flows and velocities. Particularly, the velocity of the gas discharged through the wall of the lower subchamber 156 can be smaller than the velocity of the gas discharged from other subchambers 152, 154, in consideration of the relatively small distance between the bottom wall 160 of the plenum and the surface 122 of the molten solder.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An apparatus for wave soldering a member, comprising:
   a solder reservoir;
   a wave nozzle disposed in the solder reservoir;
   a pump for ejecting a solder wave upwardly from the wave nozzle;
   a conveyor for conveying the member such that an underside thereof passes through the solder wave; and
   at least one gas plenum disposed adjacent the solder wave and including means for introducing pressurized shield gas into the plenum, the plenum including a side wall portion and a bottom wall portion, the side wall portion situated opposite the solder wave and spaced horizontally therefrom, the side portion having orifice means for discharging pressurized shield gas toward the solder wave, and the bottom wall portion being submerged within the solder in the reservoir.

2. Apparatus according to claim 1, wherein the means for introducing pressurized gas comprises a gas delivery conduit extending longitudinally within the plenum.

3. Apparatus according to claim 1, wherein the orifice means in the side wall is dimensioned so that pressurized shield gas is discharged therefrom toward the solder wave at a velocity in the range of 1–30 m/s.

4. Apparatus according to claim 1, wherein the plenum has two orifice-containing side wall portions, and a divider dividing the interior of the plenum into subchambers bordered by respective side wall portions, and gas delivery pipes extending into respective subchambers for delivering shielding gas thereto.

5. Apparatus according to claim 4, wherein each side wall portion includes an orifice-containing upper portion inclined relative to both vertical and horizontal for discharging shield gas toward and across the top of the solder wave.

6. Apparatus according to claim 1, wherein an orifice-containing part of the side wall portion is inclined relative to vertical and horizontal for discharging shield gas toward and across the top of the solder wave.

7. Apparatus according to claim 1, wherein the gas plenum includes a top wall portion having orifice means for discharging shield gas upwardly against the underside of a member to strip entrained air therefrom.

8. Apparatus according to claim 7 including a divider disposed within the plenum for dividing the plenum interior into sub-chambers communicating with the side wall portion and top wall portion, respectively.

9. Apparatus according to claim 8, wherein the means for introducing pressurized gas into the plenum introduces separate gas flows into respective sub-chambers, the divider being gas-impermeable.

10. Apparatus according to claim 8, wherein the means for introducing pressurized gas comprises gas delivery conduits disposed within respective sub-chambers and extending substantially parallel to an adjacent solder wave.

11. Apparatus according to claim 1, wherein the plenum is adjustable vertically.

12. Apparatus according to claim 11, wherein the plenum is rotatably adjustable about an axis extending substantially parallel to an adjacent solder wave.

13. Apparatus according to claim 1, wherein the plenum is adjustable horizontally.

14. Apparatus according to claim 13, wherein the plenum is rotatably adjustable about an axis extending substantially parallel to an adjacent solder wave.

15. Apparatus according to claim 1, wherein the plenum is rotatably adjustable about an axis extending substantially parallel to the adjacent solder wave.

16. Apparatus according to claim 15, wherein the means for introducing pressurized shield gas comprises a gas delivery pipe defining said axis.

17. Apparatus according to claim 1, wherein an upper portion of each plenum is spaced from the respective solder wave to form a gap therebetween, with a portion of a top surface of the solder wave disposed above, and curving away from, the gap, lower ones of the orifices being arranged to direct pressurized shield gas toward a portion of the solder wave situated below the gap, upper ones of the orifices arranged to direct pressurized shield gas toward and across the portion of the top surface of the solder wave curving away from the gap.

18. Apparatus according to claim 1 further including an enclosure overlying the solder reservoir, the enclosure having inlet and outlet ends for enabling the conveyor to pass through the enclosure, a portion of the conveyor being adjustable to vary the conveyor width and accommodate members of different widths, a curtain extending horizontally across at least one of the inlet and outlet ends to cover a portion thereof not occupied by the conveyor, one end of the curtain being connected to the adjustable conveyor portion for movement therewith when the conveyor width is adjusted.

19. Apparatus according to claim 18, wherein the opposite end of the curtain is mounted on a biased roller to be rolled up or unrolled, depending upon the direction of movement of the end thereof connected to the adjustable conveyor portion.

20. Apparatus according to claim 1, wherein the orifice means comprises narrow slits.

21. An apparatus for wave soldering a member, comprising:
a solder reservoir;
a wave nozzle disposed in the solder reservoir;
a pump for ejecting a solder wave upwardly from the wave nozzle;
a conveyor for conveying the member such that an underside thereof passes through the solder wave; and
at least one gas plenum disposed adjacent the solder wave and including means for introducing pressurized shield gas into the plenum, the plenum including a side wall portion and a bottom wall portion, the side wall portion situated opposite the solder wave and spaced horizontally therefrom, the bottom wall portion being disposed below a topside of the solder wave, the side portion having orifice means for discharging pressurized shield gas toward the solder wave, the plenum being rotatably adjustable about an axis extending substantially parallel to an adjacent solder wave.

22. Apparatus according to claim 21, wherein the plenum is adjustable horizontally.

23. Apparatus according to claim 21, wherein the plenum is adjustable vertically.

24. Apparatus according to claim 21 further including an enclosure overlying the solder reservoir, the enclosure having inlet and outlet ends for enabling the conveyor to pass through the enclosure, a portion of the conveyor being adjustable to vary the conveyor width and accommodate members of different widths, a curtain extending horizontally across at least one of the inlet and outlet ends to cover a portion thereof not occupied by the conveyor, one end of the curtain being connected to the adjustable conveyor portion for movement therewith when the conveyor width is adjusted.

25. Apparatus according to claim 24, wherein the opposite end of the curtain is mounted on a biased roller to be rolled up or unrolled, depending upon the direction of movement of the end thereof connected to the adjustable conveyor portion.

26. Apparatus according to claim 21, wherein the orifice means comprises narrow slits.

27. An apparatus for wave soldering a member, comprising:
a solder reservoir;
a wave nozzle disposed in the solder reservoir;
a pump for ejecting a solder wave upwardly from the wave nozzle;
a conveyor for conveying the member such that an underside thereof passes through the solder wave; and
at least one gas plenum disposed adjacent the solder wave and including means for introducing pressurized shield gas into the plenum, the plenum including a side wall portion, a top wall portion, and a bottom wall portion, the side wall portion situated opposite the solder wave and spaced horizontally therefrom, the bottom wall portion being disposed below a topside of the solder wave and spaced above the surface of solder in the reservoir, the side portion having orifice means for discharging pressurized shield gas toward the solder wave, and the bottom wall portion having orifice means for discharging pressurized shield gas between the bottom wall portion and the solder surface.

28. Apparatus according to claim 27, wherein the means for introducing pressurized gas comprises a gas delivery conduit extending longitudinally within the plenum.

29. Apparatus according to claim 27, wherein the orifice means in the side wall is dimensioned so that pressurized shield gas is discharged therefrom toward the solder wave at a velocity in the range of 1–30 m/s.

30. Apparatus according to claim 27 including a divider disposed within at least one plenum for dividing the plenum interior into sub-chambers communicating with the side wall portion and bottom wall portion, respectively.

31. Apparatus according to claim 30, wherein the means for introducing pressurized gas introduces separate gas flows into respective sub-chambers, the divider being gas-impermeable.

32. Apparatus according to claim 31, wherein the means for introducing pressurized gas comprises gas delivery conduits disposed within respective sub-chambers and extending substantially parallel to an adjacent solder wave.

33. Apparatus according to claim 30, wherein the means for introducing pressurized gas introduces a gas flow into one of the sub-chambers, the divider between the one sub-chamber and an adjacent sub-chamber being gas-permeable to admit gas into the adjacent sub-chamber.

34. Apparatus according to claim 33, wherein the one sub-chamber communicates with orifice means in the side wall portion of the plenum, and the adjacent sub-chamber communicates with orifice means in the bottom wall portion of the plenum.

35. Apparatus according to claim 27, wherein the top wall portion includes orifice means for discharging shield gas upwardly against the underside of a member to strip entrained air therefrom.

36. Apparatus according to claim 27, wherein the plenum is adjustable vertically.

37. Apparatus according to claim 36, wherein the plenum is rotatably adjustable about an axis extending substantially parallel to an adjacent solder wave.

38. Apparatus according to claim 27, wherein the plenum is adjustable horizontally.

39. Apparatus according to claim 38, wherein the plenum is rotatably adjustable about an axis extending substantially parallel to an adjacent solder wave.

40. Apparatus according to claim 28, wherein the plenum is rotatably adjustable about an axis extending substantially parallel to the adjacent solder wave.

41. Apparatus according to claim 40, wherein the means for introducing pressurized shield gas comprises a gas delivery pipe defining said axis.

42. Apparatus according to claim 27 further including an enclosure overlying the solder reservoir, the enclosure having inlet and outlet ends for enabling the conveyor to pass through the enclosure, a portion of the conveyor being adjustable to vary the conveyor width and accommodate members of different widths, a curtain extending horizontally across at least one of the inlet and outlet ends to cover a portion thereof not occupied by the conveyor, one end of the curtain being connected to the adjustable conveyor portion for movement therewith when the conveyor width is adjusted.

43. Apparatus according to claim 42, wherein the opposite end of the curtain is mounted on a biased roller to be rolled up or unrolled, depending upon the direction of movement of the end thereof connected to the adjustable conveyor portion.

44. Apparatus according to claim 27, wherein the orifice means comprises narrow slits.

45. An apparatus for wave soldering a member, comprising:
a solder reservoir;
a first nozzle in the reservoir for producing a turbulent solder wave projecting upwardly from a solder surface;
a second nozzle in the reservoir for producing a laminar solder wave projecting upwardly from the solder surface;
a conveyor for conveying the member such that an underside thereof passes sequentially through the turbulent and laminar waves;
a first plenum defining a first chamber and including a wall opposing one side of the turbulent wave, a first gas delivery conduit extending within the first chamber for pressurizing the first chamber with shield gas, and orifice means in the wall for discharging shield gas toward the one side of the turbulent wave;
a second plenum defining a second chamber and including a wall opposing another side of the turbulent wave, and a wall opposing one side of the laminar wave, a second gas delivery conduit extending within the second chamber for pressurizing the second chamber with shield gas, and orifice means in the walls of the second plenum for discharging shield gas toward the other side of the turbulent wave and the one side of the laminar wave; and
a third plenum defining a third chamber and including a wall opposing another side of the laminar wave, a third gas delivery conduit extending within the third chamber for pressurizing the third chamber with shield gas, and orifice means in the wall of the third plenum for discharging shield gas toward the other side of the laminar wave.

46. Apparatus according to claim 45, wherein each of the first, second and third plenums extends substantially parallel to the sides of the respective waves.

47. Apparatus according to claim 45, wherein the orifice means are dimensioned so that shield gas is discharged therefrom toward the sides of the turbulent and laminar waves at a velocity in the range of 1–30 m/s.

48. Apparatus according to claim 45, wherein each plenum includes a bottom wall submerged within the solder reservoir.

49. Apparatus according to claim 45, wherein each plenum includes a bottom wall spaced above the solder reservoir and having orifice means for discharging shield gas into a space disposed between the bottom wall and the solder reservoir.

50. Apparatus according to claim 45, wherein each of the first and third plenums includes a top wall having orifice means for discharging shield gas toward an underside of the member.

51. An inerting assembly adapted for use in a wave soldering apparatus to provide an inerting atmosphere, the assembly comprising a plenum having a top wall portion, two side wall portions, and a bottom wall portion, the wall portions extending between opposite longitudinal ends of the plenum, at least one of the side wall portions including orifice means formed therein, and a gas delivery conduit extending longitudinally within the plenum for introducing shield gas into the plenum.

52. An inerting assembly according to claim 51 further including a divider positioned within the plenum for dividing the interior of the plenum into separate sub-chambers communicating with respective ones of the wall portions, there being a gas delivery conduit extending longitudinally within each of the sub-chambers.

53. An inerting assembly according to claim 52, wherein the divider divides the interior of the plenum into two sub-chambers communicating with orifice means in respective ones of the wall portions.

54. An inerting assembly according to claim 53, wherein the two sub-chambers communicate with orifice means in respective ones of the side wall portions.

55. An inerting assembly according to claim 52, wherein the divider divides the interior of the plenum into three sub-chambers communicating with orifice means in respective ones of the wall portions.

56. An inerting assembly according to claim 55, wherein the three sub-chambers communicate with orifice means in the two side wall portions and bottom wall portion, respectively.

57. An inerting assembly according to claim 52, wherein the divider divides the interior of the plenum into four sub-chambers communicating with orifice means in a respective ones of the wall portions.

58. An inerting assembly according to claim 57, wherein the four sub-chambers communicate with orifice means in the two side wall portions, the bottom wall portion, and the top wall portion, respectively.

59. An inerting assembly according to claim 52, wherein the divider includes apertures communicating a first of the sub-chambers with a second of the sub-chambers, there being a gas delivery conduit positioned in only one of the first and second sub-chambers.

60. An inerting assembly according to claim 52, wherein the upper portions of the side wall portions are inclined so as to be convergent in a direction away from the bottom wall.

* * * * *